(12) United States Patent
Verbin et al.

(10) Patent No.: US 10,164,691 B2
(45) Date of Patent: Dec. 25, 2018

(54) HYBRID PRECODER

(71) Applicant: Sckipio Technologies S.I LTD, Ramat Gan (IL)

(72) Inventors: Rami Verbin, Tel Aviv-Jaffa (IL); Rani Keren, Tel Aviv-Jaffa (IL); Guy Reina, Giv' atayim (IL)

(73) Assignee: Sckipio Technologies S.I LTD, Ramat Gan (IL)

( * ) Notice: Subject to any disclaimer, the term of this patent is extended or adjusted under 35 U.S.C. 154(b) by 0 days.

(21) Appl. No.: 15/208,198

(22) Filed: Jul. 12, 2016

(65) Prior Publication Data
US 2016/0373168 A1 Dec. 22, 2016

Related U.S. Application Data

(62) Division of application No. 14/432,930, filed as application No. PCT/IL2013/050810 on Oct. 3, 2013, now Pat. No. 9,900,064.
(Continued)

(51) Int. Cl.
*H04B 7/04* (2017.01)
*H04B 3/32* (2006.01)
(Continued)

(52) U.S. Cl.
CPC ............. *H04B 7/04* (2013.01); *H04B 3/32* (2013.01); *H04B 7/0417* (2013.01);
(Continued)

(58) Field of Classification Search
None
See application file for complete search history.

(56) References Cited

U.S. PATENT DOCUMENTS 5,659,438 A * 8/1997 Sasamoto ............ G11B 5/5547
360/78.04
5,815,801 A * 9/1998 Hamalainen ......... H04B 1/7103
370/335
(Continued)

FOREIGN PATENT DOCUMENTS

CN 102545984 A 7/2012
WO 2011140373 A1 11/2011
WO 2012060237 A1 5/2012

OTHER PUBLICATIONS

"A Multi-User Precoding Scheme Achieving Crosstalk Cancellation with Application to DSL Systems" by G. Ginis and J.M. Cioffi, published in the Thirty-Fourth Asilomar Conference on Signals, Systems and Computers, held on Oct. 29, 2000 to Nov. 1, 2000 (5 Pages).
(Continued)

*Primary Examiner* — Andrew C Oh
(74) *Attorney, Agent, or Firm* — Brown Rudnick LLP

(57) ABSTRACT

A method employing linear precoding and non-linear precoding for transmitting data between at least two transmitters and a plurality of receivers via a plurality of communication channels over a plurality of subcarrier frequencies, the method comprising the procedures of transmitting by either one of said at least two transmitters, at least two training signals to respective said receivers; receiving by respective said receivers, said at least two training signals; evaluating channel characteristics of at least part of said communication channels, according to said at least two training signals; determining a precoding scheme selection that defines for at least part of said communication channels, over which of said subcarrier frequencies, said data transmitted shall be precoded using either one of linear precoding and non-linear precoding, according to evaluated said channel characteristics; precoding said data according to deter-
(Continued)

mined said precoding scheme selection; and transmitting said data according said precoding scheme selection.

4 Claims, 5 Drawing Sheets

Related U.S. Application Data

(60) Provisional application No. 61/885,563, filed on Oct. 2, 2013, provisional application No. 61/834,442, filed on Jun. 13, 2013, provisional application No. 61/739,022, filed on Dec. 19, 2012, provisional application No. 61/709,223, filed on Oct. 3, 2012.

(51) Int. Cl.
*H04B 7/0456* (2017.01)
*H04B 7/06* (2006.01)
*H04W 72/04* (2009.01)
*H04B 7/0417* (2017.01)
*H04B 1/04* (2006.01)

(52) U.S. Cl.
CPC .......... *H04B 7/0456* (2013.01); *H04B 7/068* (2013.01); *H04B 7/0686* (2013.01); *H04W 72/0453* (2013.01); *H04B 2001/0416* (2013.01)

(56) References Cited

U.S. PATENT DOCUMENTS

| | | | | |
|---|---|---|---|---|
| 5,969,679 A * | 10/1999 | Bolliger | ................ | H04W 64/00 342/464 |
| 6,560,471 B1 * | 5/2003 | Heller | ................ | A61B 5/0002 600/347 |
| 6,778,596 B1 * | 8/2004 | Tzannes | ................ | H04L 1/0025 375/222 |
| 6,823,002 B1 | 11/2004 | Betts | | |
| 2003/0118089 A1 * | 6/2003 | Deczky | ................ | H04L 1/0017 375/222 |
| 2003/0152141 A1 * | 8/2003 | Cherubini | ................ | H04B 3/46 375/225 |
| 2005/0221827 A1 * | 10/2005 | Natsume | ................ | H04W 36/30 455/437 |
| 2005/0255815 A1 * | 11/2005 | Hammerschmidt | ...................... | H03G 3/3078 455/132 |
| 2006/0193410 A1 * | 8/2006 | Moorti | ................ | H04W 52/52 375/347 |
| 2008/0084950 A1 * | 4/2008 | Long | ................ | H04L 1/0002 375/346 |
| 2008/0181285 A1 * | 7/2008 | Hwang | ................ | H04B 7/0452 375/148 |
| 2008/0187077 A1 * | 8/2008 | Matza | ................ | H04B 3/487 375/347 |
| 2009/0010359 A1 * | 1/2009 | Hwang | ................ | H04W 52/42 375/297 |
| 2009/0060013 A1 * | 3/2009 | Ashikhmin | ................ | H04B 3/32 375/222 |
| 2009/0122854 A1 * | 5/2009 | Zhu | ................ | H04L 25/0224 375/232 |
| 2009/0175156 A1 | 7/2009 | Xu | | |
| 2010/0022263 A1 * | 1/2010 | Stamoulis | ................ | H04W 24/02 455/501 |
| 2010/0041350 A1 | 2/2010 | Zhang et al. | | |
| 2010/0172284 A1 * | 7/2010 | Horiuchi | ................ | H04B 7/15542 370/315 |
| 2010/0208578 A1 * | 8/2010 | Lee | ................ | H04W 52/367 370/210 |
| 2010/0208837 A1 | 8/2010 | Vetter et al. | | |
| 2010/0215027 A1 * | 8/2010 | Liu | ................ | H04B 7/0695 370/338 |
| 2010/0246715 A1 * | 9/2010 | Dao | ................ | H04J 11/0033 375/296 |
| 2010/0254473 A1 * | 10/2010 | Wu | ................ | H04B 7/0434 375/267 |
| 2010/0266056 A1 * | 10/2010 | Lee | ................ | H04B 7/0452 375/260 |
| 2010/0309774 A1 * | 12/2010 | Astrom | ................ | H04B 1/525 370/201 |
| 2010/0325267 A1 * | 12/2010 | Mishra | ................ | H04L 41/069 709/224 |
| 2010/0329386 A1 * | 12/2010 | De Lind Van Wijngaarden | ......... | H04B 3/32 375/296 |
| 2010/0329444 A1 * | 12/2010 | Ashikhmin | ............... | H04B 3/32 379/406.06 |
| 2011/0044193 A1 * | 2/2011 | Forenza | ................ | H04B 7/024 370/252 |
| 2011/0085587 A1 * | 4/2011 | Moulsley | ............. | H04B 7/0408 375/219 |
| 2011/0188550 A1 | 8/2011 | Wajcer et al. | | |
| 2011/0235606 A1 * | 9/2011 | Jung | ................ | H04B 7/0626 370/329 |
| 2011/0243272 A1 | 10/2011 | Hammarwall et al. | | |
| 2012/0087430 A1 * | 4/2012 | Forenza | ................ | H04B 7/024 375/267 |
| 2012/0093078 A1 * | 4/2012 | Perlman | ................ | H04B 7/024 370/328 |
| 2012/0099674 A1 * | 4/2012 | Moulsley | ............... | H04B 7/024 375/296 |
| 2012/0147773 A1 * | 6/2012 | Kim | ................ | H04L 1/0025 370/252 |
| 2012/0151305 A1 | 6/2012 | Zhang et al. | | |
| 2012/0224652 A1 * | 9/2012 | Chen | ................ | H04B 7/0626 375/296 |
| 2012/0250556 A1 * | 10/2012 | Kottkamp | ............ | H04B 17/309 370/252 |
| 2012/0314570 A1 * | 12/2012 | Forenza | ................ | H04B 7/024 370/230 |
| 2012/0320959 A1 * | 12/2012 | Lu | ................ | H04B 3/32 375/224 |
| 2013/0010888 A1 * | 1/2013 | Moulsley | ............... | H04B 7/063 375/267 |
| 2013/0034040 A1 | 2/2013 | Priotti | | |
| 2013/0070741 A1 * | 3/2013 | Li | ................ | H04W 72/046 370/338 |
| 2013/0077597 A1 * | 3/2013 | Nukala | ................ | H04B 7/0417 370/330 |
| 2013/0084822 A1 * | 4/2013 | Thind | ................ | H03B 21/02 455/326 |
| 2013/0202015 A1 * | 8/2013 | Frank | ................ | H04B 7/0632 375/219 |
| 2013/0223269 A1 * | 8/2013 | To | ................ | H04L 25/03942 370/252 |
| 2013/0339418 A1 * | 12/2013 | Nikitin | ................ | G01R 29/02 708/819 |
| 2014/0003269 A1 * | 1/2014 | Golitschek Edler von Elbwart | ................ | H04L 5/003 370/252 |
| 2014/0064354 A1 | 3/2014 | Nakano et al. | | |
| 2014/0146904 A1 * | 5/2014 | Onodera | ............. | H04B 7/0417 375/267 |
| 2014/0177751 A1 | 6/2014 | Tomeba et al. | | |
| 2014/0177763 A1 * | 6/2014 | Tomeba | ............. | H04L 25/0212 375/340 |
| 2014/0204841 A1 * | 7/2014 | Ruiz Delgado | ...... | H04B 7/0689 370/328 |
| 2015/0146696 A1 * | 5/2015 | Golitschek Edler Von Elbwart | ................ | H04W 24/10 370/335 |
| 2015/0244418 A1 * | 8/2015 | Verbin | ................ | H04B 3/32 370/201 |

OTHER PUBLICATIONS

"A Near-Optimal Linear Crosstalk Precoder for Downstream VDSL", by R. Cendrillon et al., published in IEEE Transactions on Communications, vol. 55, No. 5, May 2007 (4 Pages).

(56) References Cited

OTHER PUBLICATIONS

International Search Report and Written Opinion dated Jan. 30, 2014, for International Application No. PCT/IL2013/050810 (13 Pages).
Supplemental Partial European Search Report dated May 13, 2016 for Corresponding European Application No. 13844432.8 (6 pages).
Yu Fu et al: "Adaptive Precoding for Switching between Spatial Multiplexing and Diversity in MIMO OFDM with Transmit Antenna and Path Correlations", IEEE GLOBECOM 2006 (6 pages).
Non-Final Office Action dated Jun. 9, 2016 for U.S. Appl. No. 14/432,930 (21 Pages).
Response to Non-Final Office Action Filed Nov. 9, 2016 for U.S. Appl. No. 14/432,930 (9 Pages).
Final Office Action dated Feb. 3, 2017 for U.S. Appl. No. 14/432,930 (14 Pages).
Response to Final Office Action Filed Jul. 28, 2017 for U.S. Appl. No. 14/432,930 (11 Pages).
Notice of Allowance dated Oct. 19, 2017 for U.S. Appl. No. 14/432,930 (11 Pages).
Extended European Search Report dated Mar. 12, 2018 for European Patent Application No. 17001866.7 (7 Pages).
"Very High Speed Digital Subscriber Line Tranceivers 2 (VDSL2); G.993.2 (12/11)", ITU-T Standard, International Telecommunication Union, Geneva, Switzerland, Dec. 16, 2011 (15 Pages).

* cited by examiner

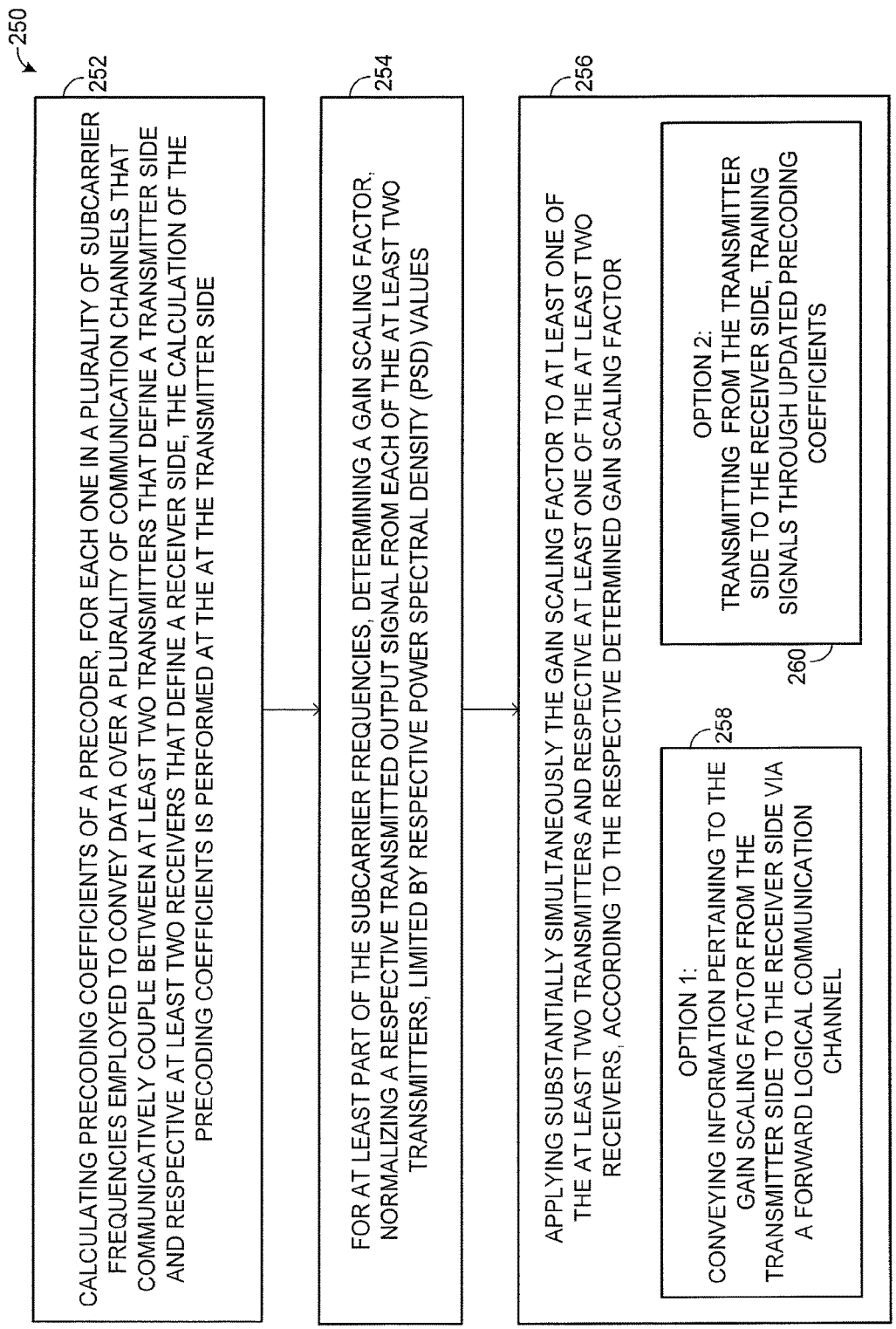

HYBRID PRECODER

FIELD OF THE DISCLOSED TECHNIQUE

The disclosed technique relates to the field of digital communications, in general, and to a technique that employs linear precoding and non-linear precoding for cross-talk cancellation (i.e., vectoring), in particular.

BACKGROUND OF THE DISCLOSED TECHNIQUE

Digital subscriber lines (DSLs) are technologies designed to provide access to electronic data by communicating over wires of traditional local telephone networks. Example DSL technologies include asymmetric digital subscriber (ADSL) and very high speed digital subscriber line (VDSL), which are methods of communicating data over twisted pairs (also known as copper pairs, subscriber loop, or plainly loop). At their inception, twisted pairs were designed and deployed to support relatively low bit rates and data content suitable for voice signals, and were not designed to carry high bit rates, especially in today's ever-growing need for high speed broadband Internet access. To supply the demand for high speed communications, optical fibers are increasingly being deployed and employed owing to their inherent greater data-carrying capacities and excellent immunity to crosstalk in comparison to those of copper pairs. The deployment of optical fiber in the last few hundred meters to the customer's equipment, however, accounts for the greater part of overall cost, the result of which compels communication operators to strive to deploy optical fiber increasingly closer to the end-user to increase performance, while concurrently bridging the troublesome remaining distance by using the existing infrastructure of twisted pairs. A disadvantage of using the existing copper wire infrastructure over "last-mile" telecommunications to the end-user is the fact that multiple copper wires stranded in parallel within a cable binder generate undesired electromagnetic interference on each other when signals are transmitted therethrough, what is known as crosstalk. Essentially, there are two kinds of crosstalk, near-end crosstalk (NEXT) and far-end crosstalk (FEXT). Known techniques to reduce NEXT may involve, for example, the use of frequency division multiplexing (FDM). FEXT is known to adversely affect performance (e.g., data bit rates) in the communication of data over VSDL implemented hardware, which utilizes relatively high frequencies bandwidth (e.g., up to 30 MHz of bandwidth).

Techniques for crosstalk cancellation that employ the precoding of data prior to its transmission are known in the art as "vectoring." Vectoring technology is used today to enhance the performance of VDSL transceivers. By the use of vectoring methods, FEXT noise is substantially cancelled, which results in higher signal to noise ratios (SNRs) as well as higher bit-rates. Known vectored VDSL solutions, take advantage of the fact that the FEXT intensity level, though significant, is much lower in comparison to the signal strength level. In a formal mathematical representation of communication channels that couple between transmitters and receivers, the channels' responses for a given frequency are represented by a matrix. The main diagonal of the channel matrix relates to the direct channels, whereas the off-diagonal elements in the channel matrix represent the cross-talk channels.

Two basic precoding schemes known in the art are linear precoding and non-linear precoding. An article entitled "A Near-Optimal Linear Crosstalk Precoder for Downstream VDSL", by R. Cendrillon et al., published by the journal entitled "IEEE Transactions on Communications", Vol. 55 No. 5, on May 2007 is directed to linear precoding via a linear crosstalk precoder for VSDL. This article describes the crosstalk precoder for downstream VSDL having relatively low run-time complexity. This crosstalk precoder is based a channel diagonalizing criterion, which requires transmitter-side operation only, and thus possesses a relatively lower complexity than the (non-linear) Tomlinson-Harashima precoder (THP), as it does not require additional receiver-side operations. Thus, the precoder presented in the article is denoted as a "diagonalizing precoder" (DP). The article claims that due to the row-wise diagonal dominance (RWDD) of the downstream VSDL channel, the DP achieves near-optimal performance.

An article entitled "A Multi-user Preceding Scheme achieving Crosstalk Cancellation with Application to DSL systems" by G. Ginis and J. M. Cioff, published in the Thirty-Fourth Asilomar Conference on Signals, Systems and Computers, held on Oct. 29, 2000-Nov. 1, 2000, describes a non-linear precoding scheme capable of achieving crosstalk cancellation involving communication between a base station and a plurality of geographically dispersed users. The non-linear precoding scheme described, borrows from the principles of the THP that is used for equalization against inter-symbol interference (ISI) and has application to DSL systems. The non-linear precoding scheme employs an equalization structure that achieves zero-forcing (ZF) equalization of a MIMO channel. Further described is the use of the non-linear precoding scheme in combination with multi-carrier modulation (e.g., discrete multi-tone (DMT)), for channels with memory, which as has application to DSL systems.

SUMMARY OF THE PRESENT DISCLOSED TECHNIQUE

It is an object of the disclosed technique to provide a novel communication system and method that combines the principles of linear precoding and non-linear precoding such to provide far-end crosstalk (FEXT) cancellation in a manner that enhances performance and lowers complexity of the communication system during transmission and reception of data between transmitters and receivers. In accordance with the disclosed technique, there is thus provided a method employing linear precoding and non-linear precoding for transmitting data between at least two transmitters and a plurality of receivers via a plurality of communication channels over a plurality of subcarrier frequencies. The method includes the procedures of transmitting by at least one of the at least two transmitters, at least two training signals to respective receivers; receiving by the respective receivers the at least two training signals; evaluating communication channel characteristics of at least part of the communication channels, according to the at least two training signals; determining a precoding scheme selection that defines for a least part of the communication channels, over which of the subcarrier frequencies, the data transmitted shall be precoded using either one of linear precoding and non-linear precoding, according to the evaluated channel characteristics; precoding the data according to the determined precoding scheme selection; and transmitting the data according the precoding scheme selection.

In accordance with another aspect of the disclosed technique there is thus provided a hybrid precoder system employing linear precoding and non-linear precoding for transmitting data between at least two transmitters and a plurality of receivers via a plurality of communication channel over a plurality of subcarrier frequencies. The at least two transmitters are communicatively coupled, respectively, with the plurality of receivers. The hybrid precoder system includes a linear precoder, a non-linear precoder, and an input selector. The linear precoder is for linearly precoding the data. The non-linear precoder is for non-linearly precoding the data. The controller is coupled with the linear precoder, and with the non-linear precoder. The input selector as well, is coupled with the linear precoder and with the non-linear precoder. The controller at least partly evaluates channel characteristics of at least part the communication channels. The controller further determines a precoding scheme selection that defines for at least part of the communication channels, over which of the subcarrier frequencies the data to be transmitted shall be precoded using either one of linear precoding and non-linear precoding, according to determined cannel characteristics. The input selector selects which of the linear precoded data and the non-linear precoded data is outputted by the hybrid precoder system, according to the precoding scheme selection.

In accordance with a further aspect of the disclosed technique there is thus provided a method employing precoding, performing gain coordination between at least one of at least two transmitters that define a transmitter side and respective at least one receiver of at least two receivers that define a receiver side that are communicatively coupled via a plurality communication channels over a plurality of subcarrier frequencies. The method includes the procedures of calculating precoding coefficients for each of the subcarrier frequencies, at the transmitter side; for at least part of the subcarrier frequencies, determining a gain scaling factor that normalizes a respective transmitted output signal from each of the at least two transmitters, to be limited by respective power spectral density (PSD) values; and applying substantially simultaneously the gain scaling factor to at least one of the at least two transmitters and respective at least one of the at least two receivers, according to respective determined gain scaling factor.

BRIEF DESCRIPTION OF THE DRAWINGS

The disclosed technique will be understood and appreciated more fully from the following detailed description taken in conjunction with the drawings in which:

FIG. 5 is a schematic block diagram of a method employing precoding, performing gain coordination between a transmitter side and a receiver side, constructed and operative according to another aspect of the disclosed technique.

DETAILED DESCRIPTION OF PREFERRED EMBODIMENTS

Figure 1:
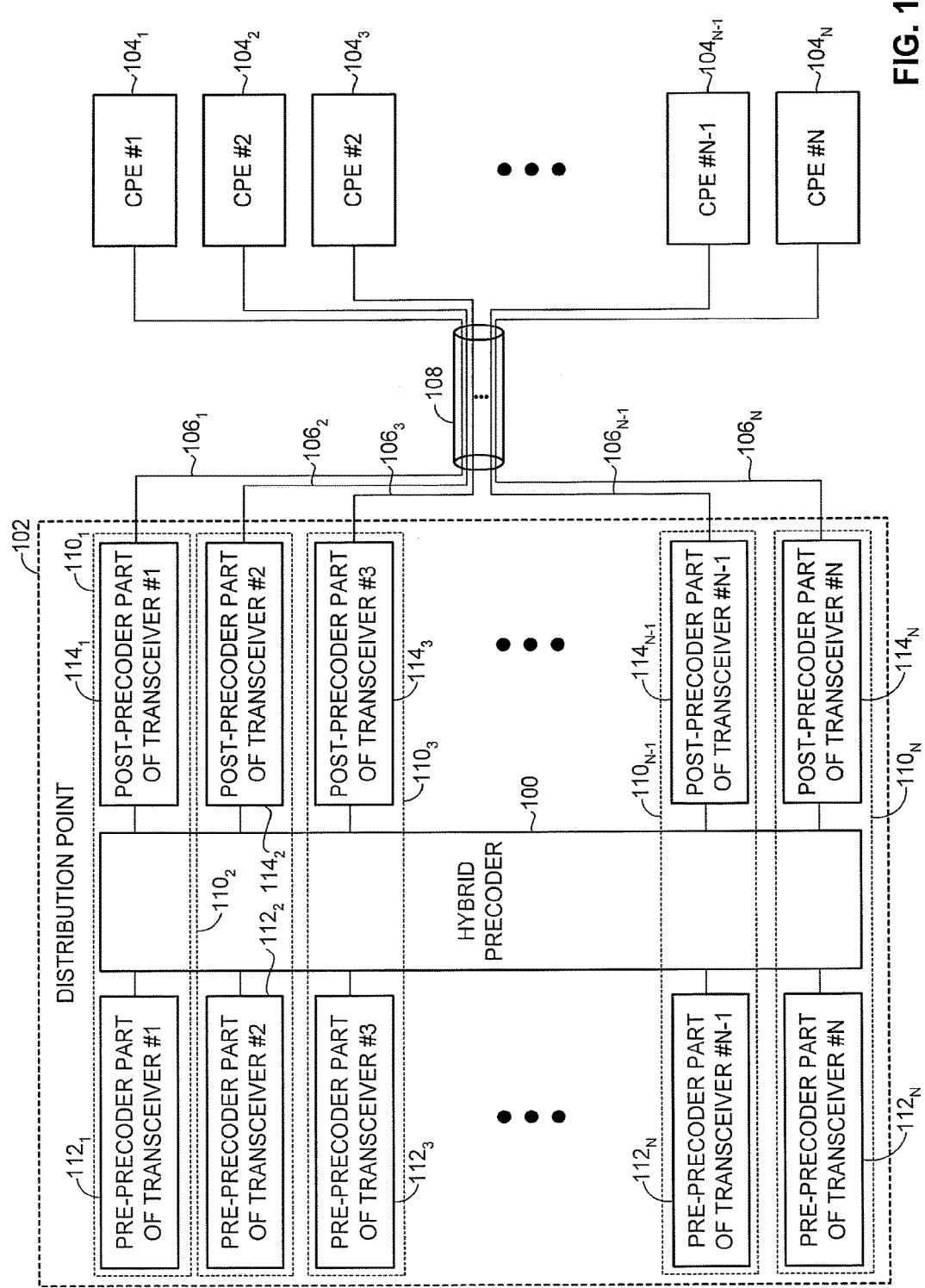
FIG. 1 is a schematic block diagram illustrating a simplified general overview of the implementation of a hybrid precoder within a multiple transmitter-receiver environment, constructed and operative in accordance with an embodiment of the disclosed technique.

The disclosed technique overcomes the disadvantages of the prior art by providing a communication system and method that combines the principles of linear precoding and non-linear precoding such to provide FEXT cancellation in a manner that enhances system performance and lowers system complexity in the transmission and reception of data between transmitters and receivers. In general, linear precoding is less complex to implement in comparison to non-linear precoding. As such, a general preference would typically be to implement linear precoding whenever acceptably possible. Nonetheless, a practical choice as to which precoding scheme to implement (i.e., linear, non-linear), is based on other crucial considerations, such as performance, which in turn depends on the communication channel characteristics. In general, communication channel characteristics are attributes of a communication channel that influences the transmission and reception parameters of that channel, such as the signal-to-noise ratio (SNR), the level of far-end cross-talk (FEXT), the signal-to-noise-plus-interference ratio (SNIR), the signal-to-FEXT ratio, noise characteristics of the channel, and the like.

The total bandwidth (BW) that is available for transmitting data between transmitters and receivers (i.e., or between transceivers) is typically limited by hardware constraints as well as the channel response. This BW is usually partitioned into a plurality of k subcarriers frequencies, where each subcarrier frequency includes its respective frequency range (i.e., frequency band). The disclosed technique employs orthogonal frequency-division multiplexing (OFDM) for encoding data (i.e., a digital bit stream) on these multiple frequencies. The "hybrid precoder" system and method of the disclosed technique are operative to monitor and evaluate the communication channel characteristics so as to determine for those communication channels, over which of the OFDM subcarrier frequencies, the transmitted data shall be precoded using linear precoding or non-linear precoding. Hence, over which of the OFDM carrier frequencies the transmitted data is linear precoded and for which of the OFDM carrier frequencies the transmitted data is non-linearly precoded. For example, FEXT levels relatively low for subcarrier frequencies employed in VSDL, which have an upper 30 MHz. In such cases where FEXT levels are relatively low, linear precoding is optimally employed. Newer wired access technologies, like G.fast, utilize higher bit-rates than those employed in VSDL. These high bit-rates are facilitated by the use of higher frequencies such as 200 MHz. For such relatively high frequencies, the FEXT levels may be very high. In fact, the crosstalk level some cases may be on the same order as the signal strength level, or perhaps even exceed it. As a result, the linear precoding scheme effectively used in VDSL may not be sufficiently suitable.

Basically, linear precoding is employed for those OFDM carrier frequencies where the FEXT level is relatively low (e.g., below a threshold value), and for those carrier frequencies where the FEXT level is relatively high (e.g., equal to or above that threshold value) non-linear precoding of data is employed. Conventionally, due to the added complexity conferred upon a system by use of non-linear precoding (e.g., extra computation), it is advantageous therefore to employ non-linear precoding only for those carrier frequencies where it is effectively necessary.

In essence, the hybrid precoder system and method of the disclosed technique employ linear precoding and non-linear precoding for the transmission of data between at least two transmitters and a plurality of receivers (i.e., at least two) via a plurality of communication channels over a plurality of subcarrier frequencies. The method and system are constructed and operative to transmit by at least one of the at least two transmitters, at least two training signals to respective at least two of the receivers. At least two of the receivers receive the respective at least two training signals from at least two transmitters. A controller, coupled with an input selector, the linear precoder, and the non-linear precoder, is operative to at least partly evaluate channel characteristics of at least part of the communication channels. Based on the evaluated channel characteristics, the controller (e.g., processor) determines a precoding scheme selection that defines for at least part of the communication channels, over which of the subcarrier frequencies the data transmitted shall be precoded using either one of linear precoding and non-linear precoding. The linear precoder and the nonlinear precoder perform linear precoding and non-linear precoding, respectively, according to the determined precoding scheme selection. The data is then transmitted in accordance with the precoding scheme selection, whereby the input selector selects which of the linear precoded data and the non-linear precoded data is outputted by the hybrid precoder system, according to the determined precoding scheme selection.

According to another aspect of the disclosed technique, there is thus provided a method that employs precoding, that performs gain coordination between at least one of at least two transmitters that define a transmitter side and respective at least one receiver of at least two receivers that define a receiver side that are communicatively coupled via a plurality communication channels over a plurality of subcarrier frequencies. The method includes the procedures of calculating precoding coefficients for each of the subcarrier frequencies at the transmitter side; determining for at least part of the subcarrier frequencies, a gain scaling factor that normalizes a respective transmitted output signal from each of the at least two transmitters, to be limited by respective power spectral density (PSD) values; and applying simultaneously the gain scaling factor to at least one of at least two transmitters and respective at least one of the at least two receivers, according to the respective determined gain scaling factor.

The terms "sub-channels", "subcarriers", and "subcarrier frequencies" are interchangeable throughout the detailed description and the claims. The terms "gain scaling factor", "gain correction", and "gain adjustment" are interchangeable throughout the detailed description and the claims. The disclosed technique is primarily directed and accordingly described herein in the perspective of the downlink direction (i.e., from data distribution equipment toward data terminal equipment), since precoding methods are implemented for use in the downlink direction. In particular, the data distribution equipment entity that communicates with its respective data terminal equipment entity, are each separately implemented by a respective transceiver that is operative to both receive and transmit data. Given that the disclosed technique is primarily directed toward the downlink direction, the data distribution equipment entity effectively functions in this sense as a transmitter, whilst the data terminal equipment functions as a receiver. Hence for the sake of simplicity, the disclosed technique will be described in this respect, without loss of generality. Notwithstanding, the disclosed technique may include hardware and functionality, such as return channels, employed to convey control data in the uplink direction (i.e., vice-versa, from the data terminal equipment toward data distribution equipment.

Reference is now made to FIG. 1, which is a schematic block diagram illustrating a simplified general overview of the implementation of a hybrid precoder, generally referenced 100, within a multiple transmitter-receiver environment, constructed and operative in accordance with an embodiment of the disclosed technique. FIG. 1 illustrates a distribution point (DP) 102, coupled with a plurality N custom premise equipment (CPE) units $104_1$, $104_2$, $104_3$, ..., $104_{N-1}$, $104_N$, via a plurality of N communication channels $106_1$, $106_2$, $106_3$, ..., $106_{N-1}$, $106_N$ that pass through a cable binder 108. DP 102 includes a hybrid precoder 100, a plurality of N transceivers $110_1$, $110_2$, $110_3$, ..., $110_{N-1}$, $110_N$. Each transceiver is operationally divided into a pre-precoder part and a post-precoder part. Specifically, transceivers $110_1$, $110_2$, $110_3$, ..., $110_{N-1}$, $110_N$ are each respectively divided into pre-precoder parts $112_1$, $112_2$, $112_3$, ..., $112_{N-1}$, $112_N$ and respective post-precoder parts $114_1$, $114_2$, $114_3$, ..., $114_{N-1}$, $114_N$, such that hybrid precoder 100 is operatively coupled between each pre-precoder part and its corresponding (index-wise) post-precoder part of each transceiver. Each pre-precoder part $112_1$, $112_2$, $112_3$, ..., $112_{N-1}$, $112_N$ includes/implements the following hardware/functionality (not shown): transport protocol specific-transmission convergence (TPS-TC), physical media specific-transmission convergence (PMS-TC), and part of physical media dependent (PMD). Each post-precoder part $114_1$, $114_2$, $114_3$, ..., $114_{N-1}$, $114_N$ includes/implements the following hardware/functionality (not shown): part of physical media dependent (PMD), an analog front end (AFE), a line I/F (interface).

Each post-precoder PMD part includes internal components (not shown) such as an inverse fast Fourier transform (IFFT) functional block, a CP (cyclic prefix) adder, a time-domain digital filter. Each AFE & line I/F part includes a digital-to-analog converter (ADC), a line driver, and a line interface. Each post-precoder part $114_1$, $114_2$, $114_3$, ..., $114_{N-1}$, $114_N$ is coupled with a respective one of CPE units $104_1$, $104_2$, $104_3$, ..., $104_{N-1}$, $104_N$, via a respective one of communication channels $106_1$, $106_2$, $106_3$, ..., $106_{N-1}$, $106_N$. In particular, post-precoder part $114_1$ of transceiver $110_1$ is coupled with CPE unit $104_1$ via communication channel $106_1$. Post-precoder part $114_2$ of transceiver $110_2$ is coupled with CPE unit $104_2$ via communication channel $106_2$, and so forth. Each one of CPE units $104_1$, $104_2$, $104_3$, ..., $104_{N-1}$, $104_N$ includes a transceiver (not shown) among other internal components (also not shown).

By definition, a transceiver is a device that includes both a transmitter and a receiver. The elements in DP 102 relate to the transmitter portion. The receiver portion may be implemented in ways known in the art, whose internal componential operation is not described herein. The disclosed technique is primarily directed toward the downlink direction, when DP 102 as well as transceivers $110_1$, $110_2$, $110_3$, ..., $110_{N-1}$, $110_N$ thereof transmit data toward respective transceivers of CPEs $104_1$, $104_2$, $104_3$, ..., $104_{N-1}$, $104_N$. Thus simplicity, DP 102 as well as transceivers $110_1$, $110_2$, $110_3$, ..., $110_{N-1}$, $110_N$ thereof will be referred herein by a naming convention as the "transmission side", "DP side", or simply as "transmitter/s" (where appropriate), unless indicated otherwise (i.e., in case of exceptions). Conversely, CPEs $104_1$, $104_2$, $104_3$, ..., $104_{N-1}$, $104_N$ will be referred herein as the "receiver side", "CPE side", or simply as the "receiver/s", (where appropriate), unless indicated otherwise.

Hybrid precoder 100 is implemented at the DP side (i.e., the downstream or downlink direction). According to the transmitter-receiver architecture shown in FIG. 1, FEXT is typically introduced at cable binder 106 where the substantial portion of mutual undesired interference between the communication channels occurs (e.g., via capacitive coupling, inductive coupling, etc.). In order to cancel or at least mitigate the effects of FEXT, precoding (i.e., deliberate pre-distortion) is applied (i.e., vectoring) at the DP side prior to transmission of data toward the CPEs (i.e., receivers' side). It is noted that though the disclosed technique particularly addresses FEXT minimization (e.g., cancellation), there may be other types of noise present (e.g., thermal noise, alien noise from external interference sources not due to FEXT). Since the disclosed technique is directed toward the downlink direction, where all transceivers of DP 102 share substantially the same location (co-located), and thus, where the application of transmit schemes based on precoding of transmission signals are substantially most effective.

The disclosed technique combines the principles of linear precoding and non-linear precoding into a single system that is operative to substantially cancel or minimize FEXT thereby improving performance (i.e., achieving high data transmission rates). Generally, linear precoding is much simpler to implement in comparison to non-linear precoding, for the complexity in the implementation at the transmitter side is considerably lower. Furthermore, linear precoding does not necessitate use of a non-linear modulo operation. In comparison to linear precoding, however, non-linear precoding may get closer to achieving channel capacity. In principle, usage of non-linear precoding limits the magnitude of the transmitted signal and eliminates the possibility for the emergence of instabilities due to the use of an inverse filter whose output may diverge to infinity. The selection of whether, at a given time, linear precoding or non-linear precoding shall be employed for the transmission of data over each communication channels $106_1, \ldots, 106_N$ is made on a per OFDM subcarrier basis (i.e., and is common to all of the precoder inputs for a given subcarrier frequency). The selection may be performed per subcarrier frequency or group of subcarriers frequencies based on the channel characteristics and in accordance with the crosstalk (XT) characteristics exhibited by the subcarriers frequencies. This selection is updated from time to time, whether regularly (e.g., according to a time schedule) or irregularly, subject to changing channel XT characteristics.

Figure 2:
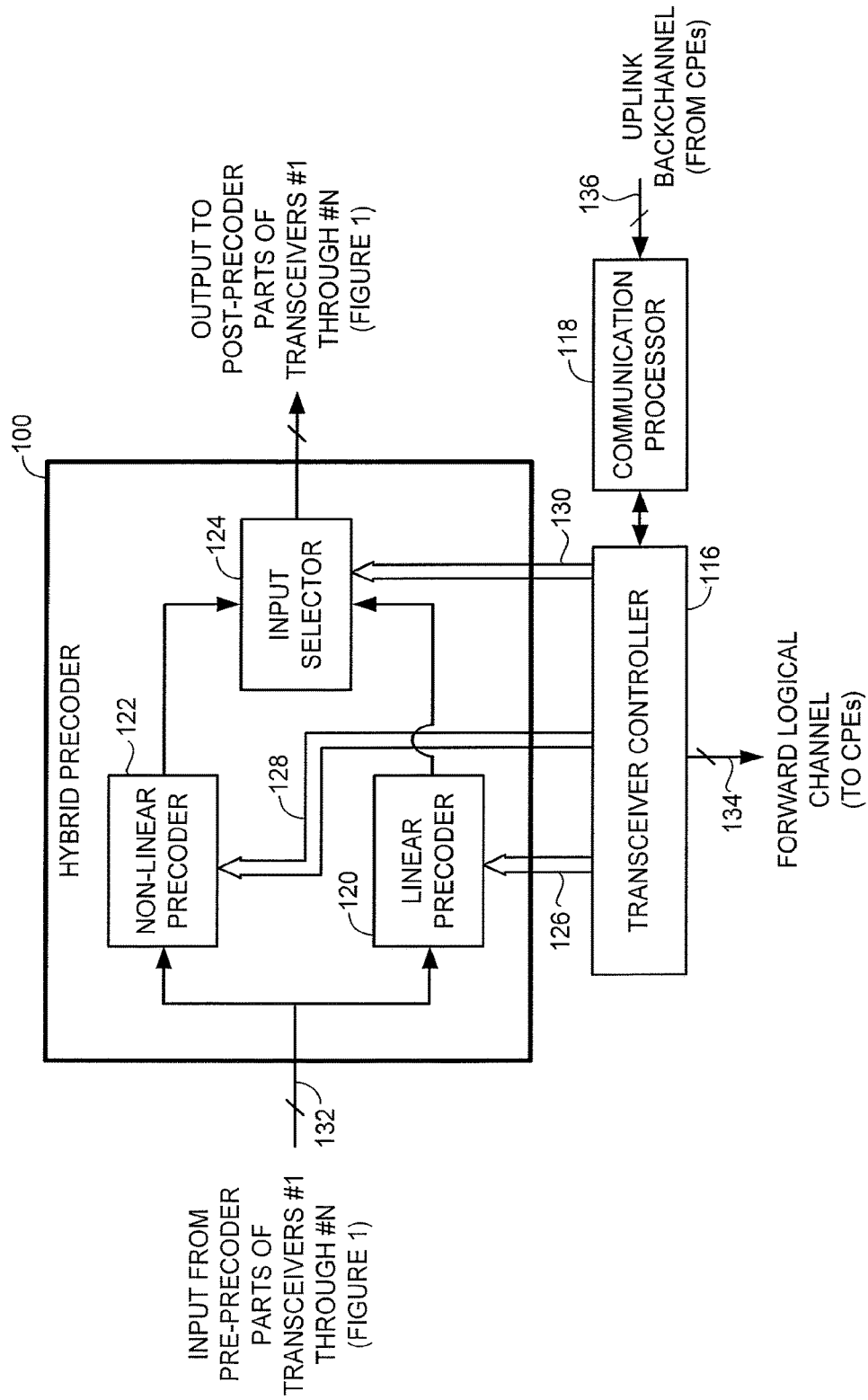
FIG. 2 is a schematic block diagram illustrating the principal elements of the hybrid precoder, constructed and operative in accordance with the embodiment of the disclosed technique.
Figure 3:
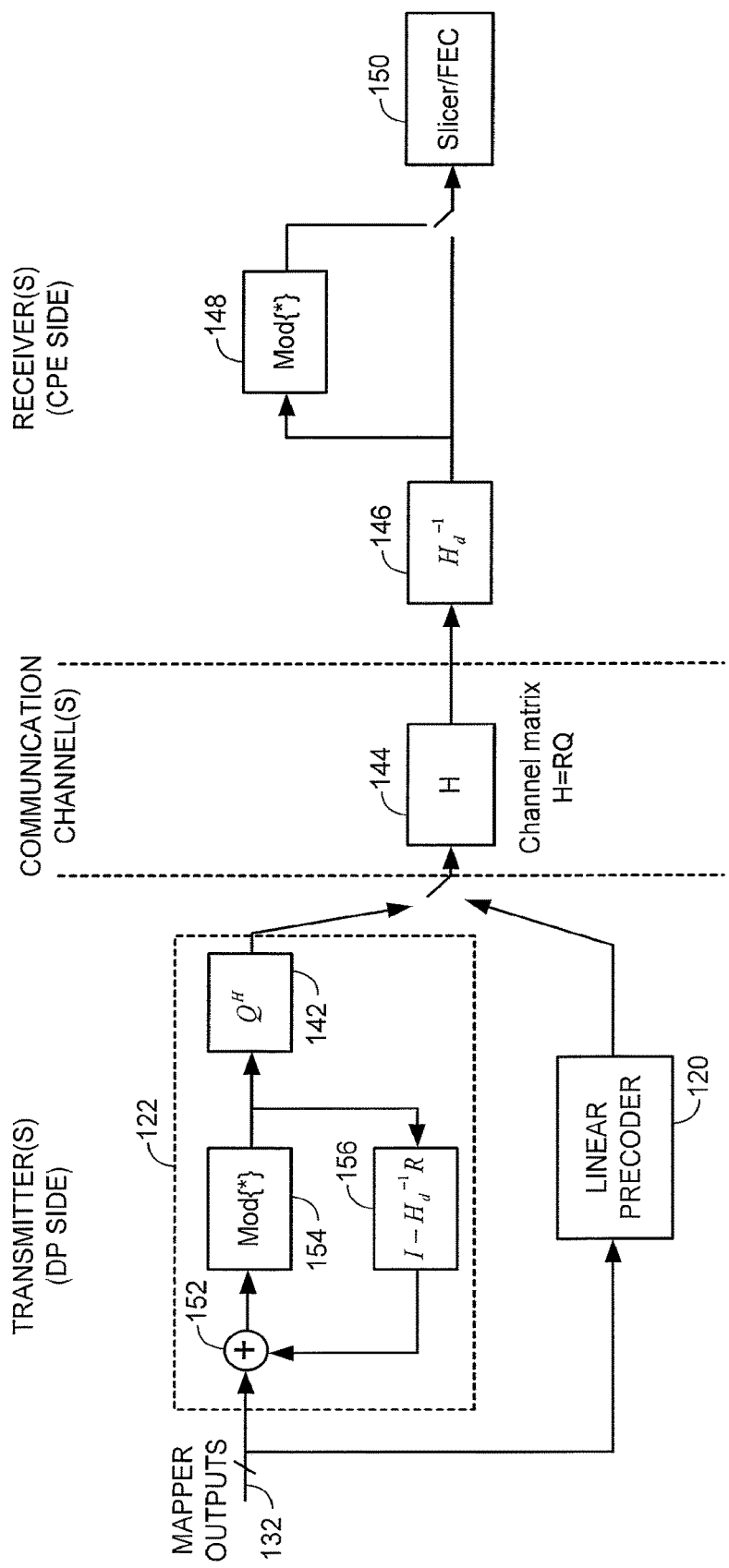
FIG. 3 is a schematic block diagram of hybrid precoding scheme, constructed and operative in accordance with the embodiment of the disclosed technique.

To further detail the hybrid precoding scheme of the disclosed technique, reference is now made to FIGS. 2 and 3. FIG. 2 is a schematic block diagram illustrating the principal elements of the hybrid precoder, constructed and operative in accordance with the embodiment of the disclosed technique. FIG. 3 is a schematic block diagram of a hybrid precoding scheme, constructed and operative in accordance with the embodiment of the disclosed technique. To simplify the understanding of the disclosed technique, the following description with regard to the construction and operation of the hybrid precoder will be made with respect to a particular subcarrier frequency, as description of the disclosed technique equally applies to the other subcarriers (e.g., 1 out of 2048). Hence, a hybrid precoder scheme implemented for each subcarrier frequency independently, or group of subcarrier frequencies, collectively.

FIG. 2 illustrates hybrid precoder 100, a transceiver controller 116, and a communication processor 118. Hybrid precoder 100 includes linear precoder 120, a non-linear precoder 122, and an input selector 124. Input selector 124 is coupled with linear precoder 120 and non-linear precoder 122 via respective data channels (i.e., represented in FIG. 2 by thin lines and arrows). Communication processor 118 is coupled with transceiver controller 116, which in turn is coupled with linear precoder 120, non-linear precoder 122, and input selector via respective control channels (i.e., represented by thick lines and arrows). Specifically, transceiver controller 116 communicates with linear precoder 120 via a linear precoder update control channel 126, with non-linear precoder 122 via a non-linear precoder update control channel 128, and via input selector 124 via a carriers' selection control channel 130. According to an alternative implementation, communication processor 118 is integrated into transceiver controller 116 (not shown).

FIG. 3 illustrates a representative block diagram of the hybrid precoding scheme, which may be diagrammatically described in terms of three sections. The section on the left of the left vertical dashed line represents the transmitter (DP) side; the section on the right of the right vertical dashed line represents the receiver (CPE) side; and the section confined between the left and right vertical dashed lines represents the communication channel that conveys data between transmitter side and receiver side. FIG. 3 illustrates linear precoder 120 and non-linear precoder 122 of FIG. 2, a block representing the channel matrix 144, a frequency equalizer (FEQ) block 146, a receiver-side modulo operation block 148, and a slicer/FEC (forward error correction) block 150. Non-linear precoder 122 (FIG. 3) includes an adder 152, a transmitter-side modulo operation block 154, a feedback filter block 156, and a transmission matrix block 142. Both linear precoder 120 and non-linear precoder 122 are operative to receive via data bus 132, as input (i.e., referred "hybrid precoder input"), data that is outputted from the pre-precoder transceiver parts $112_1, 112_2, \ldots, 112_{N-1}, 112_N$ (FIG. 1). Generally, each transceiver $110_1, 110_2, \ldots, 110_N$ of DP 102 (FIG. 1) outputs precoded symbols modulated by a digital modulation scheme (e.g., quadrature amplitude modulation (QAM)) that may be represented via a constellation diagram in the complex plane. Mathematically, the hybrid precoder input signal (not shown), for each subcarrier, may be represented as a vector having complex elements and whose rank is as the number of transmitters (e.g., N transmitters).

Cancellation of FEXT involves pre-compensation, the first step of which entails evaluating the effect of crosstalk that is experienced on a known training signal during its transmission through the communication channels. Information obtained through the evaluation (i.e., "learning") is subsequently used to modify (payload) data prior to its transmission (i.e., precoding), such to negate the effects of FEXT on that data during transmission (e.g., by subtracting the evaluated crosstalk from the transmission signal). To apply appropriate precoding and thus substantially eliminate or minimize FEXT, the joint characteristics of communication channels $106_1, 106_2, \ldots, 106_N$ (i.e., "channel characteristics") need to be evaluated (i.e., estimated, "learned"). This is also known as channels estimation. Channel estimation (or channel matrix estimation) involves knowing the elements in channel matrix H (i.e., the "FEXT coefficients") as well as other various performance measures (e.g., SNR, the signal attenuation level). Channel matrix H subcarrier k (also denoted herein by $H^{(k)}$) for N communication channels may be generally represented by the following matrix:

$$H^{(k)} = \begin{pmatrix} H_{11}^{(k)} & \cdots & H_{1N}^{(k)} \\ \vdots & \ddots & \vdots \\ H_{N1}^{(k)} & \cdots & H_{NN}^{(k)} \end{pmatrix}. \tag{1}$$

The diagonal elements in channel matrix H (i.e., $H_{ii}$ where i is an integer between 1 and N) represent the direct i-th communication channel corresponding to the transfer function of the transmitted signal on the i-th communication channel. Off-diagonal elements in channel matrix H (i.e., where i≠j and are both integers between 1 and N) represent the FEXT coupling coefficients between the i-th and j-th communication channels.

Training signals may also be described in terms of symbols. Symbols used for training purposes are denoted as "synchronization symbols" or simply "sync symbols". Generally, each symbol is associated with or defined by at least one subcarrier of an integer number of k subcarriers. A symbol may be described as a signal element that is defined, at least partly, by at least one (typically a plurality) of subcarriers. Symbols persist for a preset period of time. Sync symbols may be transmitted either precoded or non-precoded in accordance with the precoding scheme employed by the transmitter (DP). For transmissions over subcarriers that are linearly precoded, precoded sync symbols are usually preferred.

Self-FEXT cancellation (i.e., vectoring) involves precoding data before transmission such to essentially eliminate the off-diagonal elements in channel matrix H. For this purpose, the FEXT coefficients for each of the k subcarriers need to be first determined or estimated, according to a channel estimation procedure. Channel estimation is performed per subcarrier k.

To estimate the channel characteristics and thus, channel matrix H, known training signals (not shown) are initially transmitted from the DP transceivers $110_1, 110_2, \ldots 110_N$ toward CPE receiver units $104_1, 104_2, \ldots, 104_N$, via communication channels $106_1, 106_2, \ldots, 106_N$. Hence, a training signal (also known as a "pilot sequence", a "probing signal"), which may be represented by the vector $T=[t_1, \ldots, t_N]$ is transmitted simultaneously over the communication channels, where the received signals (i.e., vectored per receiver) is represented by: Y=HT+N (for a particular subcarrier), where $N=[n_1, \ldots, n_N]$ (N not italicized) represents the noise matrix for channels i=1, . . . , N (N index italicized). Typically, the pilot sequence is selected such that its corresponding vector dimension is greater than the number of the communication channels passing through the cable binder (i.e., in this case greater than N). CPE units $104_1, 104_2, \ldots, 104_N$ receive these training signals and transmit return training signals (e.g., that are transformed, modified) back to the transmitter side (DP 102) via a return channel, referred to herein as uplink backchannel 136 (FIG. 2). The return training signals may include different kinds of information. A typical implementation is based on a receive error. This error may be calculated based on decisions (decision directed), or based on the known transmitted signal parameters. The receive error is also denoted herein as "slicer error" or simply as "error". The error that is generated by slicer/FEC block 150 at the CPE side (as will be further detailed). Basically, the slicer error is utilized by DP 102 to estimate the FEXT coupling coefficients, which in turn are employed in determining the respective precoder precompensation coefficients (i.e., for linear precoder 120 as well as for non-linear precoder 122). Uplink backchannel 136 from the CPEs to the DP (i.e., in the upstream direction) is used to facilitate the calculation or adaptation of the precoder coefficients. Such a return channel is specified by the International Telecommunication Union (ITU) G.vector standard (G.993.5) for the linear precoder. For the case of hybrid precoder 100 of the present disclosed technique, uplink backchannel 136 is employed irrespective of which precoder scheme is used. Hence, hybrid precoder 100 is operative to use the same return channel for both linear and non-linear precoding schemes. The content pertaining to the transmitted sequence (i.e., the modified training signal), which is sent back to DP 102 is typically based on slicer-error (i.e., a description of which will follow).

Accordingly, the received signals may be represented in matrix form by Y=HT+N may in take into account those training signals that may be transformed by the communication channels i=1, . . . , N (N index italicized. By using the combined information of a plurality of transmitted training signals $T=[t_1, \ldots, t_N]$ as well as those training signals transformed (e.g., modified, return training signals) by the communication channels that are received, the values of the matrix elements in channel matrix H are determined.

Specifically, the modified training signals are based on an error produced by slicer/FEC block 150 of each of CPE units $104_1, 104_2, \ldots, 104_N$. An error signal is based on the signal it receives from either FEQ block 146 (i.e., in the case of linear precoding) or receiver side modulo operation block 148 (i.e., in the case of non-linear precoding), accordingly. The error signal is determined by comparing the received signal to a reference (i.e., the expected training signals). Error signals facilitate estimation of the direct channels as well as estimation of the crosstalk channels by each CPE. Alternatively, this estimation may be performed in a centralized manner by the DP. Further alternatively, at least part of the information pertaining to the error signals are communicated to the DP (by the CPEs) to facilitate this estimation. In particular, each of CPE units $104_1, 104_2, \ldots, 104_N$ may measure each of the cross-coupling training signals it receives ultimately yield the crosstalk coefficients. The sync symbols used to facilitate channel estimation may be based on orthogonal Walsh-Hadamard (WH) sequences.

The error (i.e., error signal) may be calculated based on the slicer/FEC block 150 (i.e., being decision directed). Alternatively, this error may be calculated based on the knowledge of the transmitted signal (i.e., essentially not a decision based error that is generated by slicer/FEC block 150). Basically, this may be achieved based on information obtained during a handshake procedure prior to the establishment of the communication link between the DP and the CPEs in which the DP conveys information to the CPEs that enables recovery of transmitted constellation points.

The channel estimation procedure is processed (i.e., computed) at the receiver side (i.e., via a processor of the CPE—not shown). Alternatively, raw data pertaining to channel estimation is conveyed (e.g., in raw format) to communication processor 118 of the transmitter for processing (i.e., either in its entirety or partially), via uplink backchannel 136. Upon determination of channel matrix $H^{(k)}$ for subcarrier k it is necessary to determine a precoding matrix $P^{(k)}$ with which data will be precoded prior to transmission. Precoding generally involves the introduction of distortion to outbound transmitted signals on each of communication channels $106_1, 106_2, \ldots, 106_N$ where distortion is chosen such that it substantially cancels with the crosstalk exhibited in cable binder 108. In general, the output, $D^{(k)}$ of a linear precoder per subcarrier k may be represented by the matrix multiplication: $D^{(k)}=P^{(k)}x^{(k)}$, where $x^{(k)}$ represents a vector of the intended signals for N communication channels. The received signal for the i-th channel and k-th subcarrier is thus:

$$y_i^{(k)}=H^{(k)}P^{(k)}x_i^{(k)}+n_i^{(k)} \qquad (2),$$

where $n_i^{(k)}$ denotes the noise of the k-th subcarrier on the i-th communication channel. Linear precoding may be achieved by employing, for example, zero-forcing (ZF) precoding, where precoding matrix $P^{(k)}$ is selected such that $H^{(k)}P^{(k)}$ is diagonal. Other linear precoding methods include transit Wiener precoding, maximum ratio transmission (MRT), and the like. Non-linear precoding, also referred to as dirty paper coding (DPC), includes methods such as Tomlinson-Harashima precoding (i.e., employing modulo arithmetic operation), Costa precoding, "the vector perturbation technique", and the like. Alternatively, the precoding matrix of linear precoder 120 and that of non-linear precoder 122 may be calculated directly from the error signals (i.e., not through an intermediate process of channel estimation). There are various ways of calculating precoding matrices (e.g., by use of adaptive filters, etc.).

With reference to FIG. 3, upon determination of channel matrix H (i.e., via use of training signals so as to determine respective transmitter receiver transfer functions) the matrix Q of transmission matrix block 142 as well as the matrix R of feedback filter block 156 may be computed by employing Q-R factorization of channel matrix H. It is noted that matrix R is an upper triangular matrix and the following matrix equality holds: $Q^H Q = I$, where I represents the identity matrix. Furthermore the matrix of feedback filter block 156, namely $I - H_d^{-1}R$ as well as the matrix of frequent equalizer block 146, namely, $H_d^{-1}$ may be computed (i.e., by transceiver controller 116). The matrix $H_d^{-1}$ represents the frequency equalizer (FEQ) matrix, which is a diagonal matrix holding the inverse of the direct communication channel coefficients. The channel matrix H equals matrix multiplication of matrices R and Q (i.e., H=RQ). The "Mod {*}" designation within receiver-side modulo operation block 154 as well as within transmitter-side operation block 148 in FIG. 3, represents the modulo arithmetic operation that is performed according to non-linear precoding principles (e.g., Tomlinson-Harashima), corresponding to the constellation used per subcarrier and transmitter (DP).

The signals that encode payload data are received by frequency equalizer (FEQ) block 146, at the receivers (CPEs side). In response, FEQ block 146 produces a signal that is fed to modulo operation block 148 and slicer/FEC block 150. The signal outputted from FEQ block 146 may be represented by a diagonal matrix whose diagonal elements are the inverse of the direct communication channel coefficients. The use of modulo arithmetic operation in modulo operation block 148 is essentially only required for those subcarriers using the non-linear precoder scheme. In FIG. 3, receiver-side modulo operation block 148 is intended for only those subcarriers that convey data transmissions precoded by the non-linear precoding scheme. Information regarding which subcarriers convey data that is precoded with the linear precoding scheme and which subcarriers convey data precoded by the non-linear precoding scheme is performed by DP 102. DP 102 sends a configuration message via forward logical channel 134 to the CPEs specifying whether modulo arithmetic operation was applied at the DP (transmitter side). Moreover, this configuration message details for which of the k subcarriers the modulo arithmetic operation was employed (i.e., in accordance with the precoding scheme selection. For subcarriers that employ linear precoding, modulo arithmetic operation is not necessitated at the CPE receiver side. Hence, the modulo arithmetic operation may be only employed at the CPE side for non-linear precoded data transmitted (from the DP side) over those subcarriers and communication channels determined to convey the non-linear precoded data. Slicer/FEC block 150 generates an error based on the signal receives from either FEQ block 146 (i.e., in the case of linear precoding) or receiver modulo operation block 148 (i.e., in the case of non-linear precoding), accordingly. In an alternative implementation (not shown), receiver-side modulo operation block 148 is integrated into slicer/FEC block 150. It is noted that training symbols transmitted over subcarriers utilizing THP may be transmitted without an active precoder (i.e., the precoder is bypassed, to ease the channel estimation process). In other words, according to one of the implementations for simplifying the channel estimation process, training symbols transmitted over those subcarriers selected to convey non-linear precoded data are transmitted directly such that the respective non-linear precoder is temporarily bypassed (not employed, i.e., the pre-precoder part of the transceiver is directly coupled with the post-precoder part of its respective transceiver—not shown).

The operation of linear precoder 120 is essentially based on matrix multiplication and there are various known ways for calculating the precoding matrix coefficients (e.g., by the zero-forcing (ZF) method). At any rate, the degree of performance loss with the use of linear precoding relates to the level of FEXT that is present in the communication channels.

In the case of transmissions over subcarriers that are non-linearly precoded, non-precoded sync symbols are employed (i.e., since the Q-R decomposition (factorization) calculation requires knowledge of the full crosstalk matrix rather than the residual crosstalk matrix). The selection of whether linear precoding with precoded sync symbols are employed or non-linear precoding with non-precoded sync symbols are employed is determined per subcarrier or group of subcarriers and communicated from the DP side to the CPE side via a forward logical channel 134 (FIG. 2).

A precoder update algorithm is employed to update the precoder coefficients in precoding matrix $P^{(k)}$ (i.e., "training" or "adaptation"). Various adaptive algorithms may be employed. For example, the precoder update algorithm can be differential (e.g., iterative least mean square (LMS)), whose precoded sync symbols will result in a channel estimation for a residual crosstalk matrix (i.e., only the differential increment/decrement values ("deltas")). For both linear precoder 120 and non-linear precoder 122, the precoder adaptation process may employ a row-normalized channel matrix, so as to take into account the effect of the FEQs of CPE units $104_1, 104_2, \ldots, 104_N$ on the applied precoding. A row-normalized matrix is defined such that each element in a row of the original channel matrix $H^{(k)}$ (i.e., non-normalized) is divided by the corresponding diagonal element of that row. The resulting row-normalized matrix has unity values in all of its diagonal elements. An error that is based on FEQ block 146 output enables the estimation of this row-normalized channel matrix minus the identity matrix. The row normalization is achieved by FEQ block 146 that functionally multiplies each row in the original channel matrix $H^{(k)}$ by an FEQ coefficient that is adapted to equal the reciprocal of the channel direct gain that is represented by the diagonal element. In particular, given that $$\begin{pmatrix} x_1 \\ \vdots \\ x_N \end{pmatrix}$$

represents the transmitted signal, $$\begin{pmatrix} Y_1 \\ \vdots \\ Y_N \end{pmatrix}$$

represents the received signal, and $$\begin{pmatrix} Z_1 \\ \vdots \\ Z_N \end{pmatrix}$$

represents the signal outputted by FEC block 146, the relationship between the transmitted signal and the received signal is given by equation (3):

$$\begin{pmatrix} Y_1 \\ \vdots \\ Y_N \end{pmatrix} = \begin{pmatrix} H_{11}^{(k)} & \cdots & H_{1N}^{(k)} \\ \vdots & \ddots & \vdots \\ H_{N1}^{(k)} & \cdots & H_{NN}^{(k)} \end{pmatrix} \begin{pmatrix} X_1 \\ \vdots \\ X_N \end{pmatrix}. \tag{3}$$

The relationship between the transmitted signal and the signal outputted by FEQ block 146 is given by equations (4):

$$\begin{pmatrix} Z_1 \\ \vdots \\ Z_N \end{pmatrix} = \begin{pmatrix} \frac{1}{H_{11}^{(k)}} & \cdots & 0 \\ \vdots & \ddots & \vdots \\ 0 & \cdots & \frac{1}{H_{NN}^{(k)}} \end{pmatrix} \begin{pmatrix} Y_1 \\ \vdots \\ Y_N \end{pmatrix} = \tag{4}$$

$$\begin{pmatrix} \frac{1}{H_{11}^{(k)}} & \cdots & 0 \\ \vdots & \ddots & \vdots \\ 0 & \cdots & \frac{1}{H_{NN}^{(k)}} \end{pmatrix} \begin{pmatrix} H_{11}^{(k)} & \cdots & H_{1N}^{(k)} \\ \vdots & \ddots & \vdots \\ H_{N1}^{(k)} & \cdots & H_{NN}^{(k)} \end{pmatrix} \begin{pmatrix} X_1 \\ \vdots \\ X_N \end{pmatrix} =$$

$$\begin{pmatrix} 1 & \cdots & \frac{H_{1N}^{(k)}}{H_{11}^{(k)}} \\ \vdots & \ddots & \vdots \\ \frac{H_{N1}^{(k)}}{H_{NN}^{(k)}} & \cdots & 1 \end{pmatrix} \begin{pmatrix} X_1 \\ \vdots \\ X_N \end{pmatrix},$$

where the matrix:

$$\begin{pmatrix} 1 & \cdots & \frac{H_{1N}^{(k)}}{H_{11}^{(k)}} \\ \vdots & \ddots & \vdots \\ \frac{H_{N1}^{(k)}}{H_{NN}^{(k)}} & \cdots & 1 \end{pmatrix}, \tag{5}$$

represents the row-normalization of channel matrix $H^{(k)}$, and the FEQ coefficients are the diagonal elements in the matrix:

$$\begin{pmatrix} \frac{1}{H_{11}^{(k)}} & \cdots & 0 \\ \vdots & \ddots & \vdots \\ 0 & \cdots & \frac{1}{H_{NN}^{(k)}} \end{pmatrix}. \tag{6}$$

The outputted FEQ signal subtracted by the transmitted signal is related to the transmitted signal in by the following equations (7):

$$\begin{pmatrix} Z_1 - X_1 \\ \vdots \\ Z_N - X_N \end{pmatrix} = \begin{pmatrix} 1 & \cdots & \frac{H_{1N}^{(k)}}{H_{11}^{(k)}} \\ \vdots & \ddots & \vdots \\ \frac{H_{N1}^{(k)}}{H_{NN}^{(k)}} & \cdots & 1 \end{pmatrix} \begin{pmatrix} X_1 \\ \vdots \\ X_N \end{pmatrix} - \begin{pmatrix} 1 & \cdots & 0 \\ \vdots & \ddots & \vdots \\ 0 & \cdots & 1 \end{pmatrix} \begin{pmatrix} X_1 \\ \vdots \\ X_N \end{pmatrix} = \tag{7}$$

$$\begin{pmatrix} 0 & \cdots & \frac{H_{1N}^{(k)}}{H_{11}^{(k)}} \\ \vdots & \ddots & \vdots \\ \frac{H_{N1}^{(k)}}{H_{NN}^{(k)}} & \cdots & 0 \end{pmatrix} \begin{pmatrix} X_1 \\ \vdots \\ X_N \end{pmatrix},$$

where the matrix $$\begin{pmatrix} 0 & \cdots & \frac{H_{1N}^{(k)}}{H_{11}^{(k)}} \\ \vdots & \ddots & \vdots \\ \frac{H_{N1}^{(k)}}{H_{NN}^{(k)}} & \cdots & 0 \end{pmatrix}, \tag{8}$$

represents the row-normalized matrix subtracted by the identity matrix. It is noted that in the general case, the FEQ coefficients may not necessarily be adapted to the reciprocal of the diagonal elements of channel matrix $H^{(k)}$ (e.g., cases where the FEQ coefficients are mismatched to the communication channel due to changes to the channel characteristics).

After channel estimation was performed and precoder precompensation determined for respective linear precoder 120 and non-linear precoder 122 (e.g., precoder coefficients in respective precoding matrix $P^{(k)}$ calculated, i.e., the "precoder precompensation matrix"), transceiver controller 116 decides on the selection (i.e., allocation) of subcarriers to either one of the two precoding schemes (i.e., linear and non-linear precoding). This selection may be performed per subcarrier frequency, individually, as well as per group of subcarrier frequencies, collectively. In particular, transceiver controller 116 determines for each of the communication channels, over which of the k subcarrier frequencies, data to be transmitted shall be precoded using linear precoding of non-linear precoding (i.e., in accordance with the determined channel characteristics). The selection is based on channel characteristics, which includes but is not limited to the channel response, the signal-to-FEXT ratio, signal-to-noise ratio (SNR), the signal-to-noise-plus-interference radio (SNIR), background noise levels (e.g., alien noise), FEXT coupling, elements of channel matrix H for the communication channels for at least part of the BW (i.e., part of k subcarrier frequencies), attributes of said communication channels that influence transmission and reception parameters, and the relations therebetween.

In general, it is advantageous to employ non-linear precoding in cases where the FEXT level is relatively high (i.e., substantially on the order of the signal strength level), since in such cases THP outperforms linear precoding. Apart from FEXT considerations, other considerations may take into account like the SNR of the system, which may have influence in the determination of the selection. For example, for low SNR (i.e., for smaller constellations like 4-QAM), THP is less optimal than linear precoding. Thus for low SNR levels linear precoding may be advantageous over non-linear precoding. Conversely, in the case of data transmitted over those subcarrier frequencies exhibiting relatively low FEXT levels (i.e., whose order is substantially lower than the order of the strength level of a signal that conveys the transmitted data), it is advantageous to linearly precode the data.

For example, suppose that there are 2048 OFDM subcarrier frequencies and that it was determined in the channel estimation procedure that the signal-to-FEXT ratio surpasses a predetermined threshold level for subcarriers 1024 through 2048. According to this information, transceiver controller 116, at the transmitter side, decides that a transmitted over OFDM subcarriers 1024 through 2048 shall be precoded by non-linear precoder 122, whereas data transmitted over OFDM subcarriers 1 through 1023 shall be precoded by linear precoder 120. The example given above is rather simplistic, as more generally, the available BW may be divided to an even greater number of groups of subcarrier frequencies (i.e., more than two), each with respective threshold levels, and that each conveys data precoded by either linear precoding or non-linear precoding. In an alternative implementation, the selection as to which subcarrier frequency shall employ which precoding scheme (i.e., linear or non-linear) is facilitated at least in part by some preprocessing performed at the receiver CPE side, the result of which is conveyed to the transmitter DP side (i.e., transceiver controller 116 via uplink backchannel 136).

Once channel estimation is performed and precoder precompensation determined (e.g., precoder coefficients in precoding matrix $P^{(k)}$ calculated), transceiver controller 116 decides on the selection (i.e., allocation) of subcarriers to either one of the two precoding schemes (i.e., linear and non-linear precoding). This selection is performed per subcarrier individually. Alternatively, the selection is performed per group of subcarriers, collectively. Particularly, transceiver controller 116 determines for each of the communication channels, over which of the k subcarrier frequencies, data to be transmitted precoded using linear precoding or non-linear precoding (i.e., in accordance with the determined channel characteristics).

Transceiver controller 116 functions as a vectoring control entity (VCE) that manages the crosstalk cancellation process by updating linear precoder 120 via linear precoder update control channel 126 as well as non-linear precoder 122 via non-linear precoder update control channel 128 with updated value respective precoder coefficients (i.e., also referred respectively as, linear precoding precompensation matrix coefficients (elements) and non-linear precoding precompensation matrix coefficients (elements)). These updated precoder coefficients are calculated based on the newly estimated channel matrix or directly derived from the error signal data (e.g., from the error signal) communicated from the CPE via uplink backchannel 136. Transceiver controller 116 calculates the newly estimated channel matrix coefficients for the respective functional blocks illustrated in FIG. 3.

In particular, transceiver controller 116 updates linear precoder 120 via linear precoder update control channel 126 as well as non-linear precoder 122 via non-linear precoder update control channel 128 with updated values of the FEXT coupling coefficients (i.e., off-diagonal elements in channel matrix H), received by DP 102 via uplink backchannel 136 (i.e., in the upstream direction). Liner precoder 120 generates a ("linear") precoding precompensation matrix, such as $P^{(k)}$ that is utilized to compensate for FEXT in the signal transmitted from DP 102 to each of CPE units $104_1$, $104_2$, ..., $104_N$, for those OFDM subcarriers selected for conveying linearly precoded data. Likewise, non-precoder 122 generates a ("non-linear") precoding precompensation matrix that is utilized to compensate for FEXT in the signal transmitted from DP 102 to each of CPE units $104_1$, $104_2$, ..., $104_N$, for those OFDM subcarriers selected for conveying non-linearly precoded data. Transceiver controller 116 determines a precoding scheme selection that defines for at least part of the communication channels, over which of the subcarrier frequencies (particular subcarrier or group of subcarriers), the transmitted data shall be precoded using linear precoding or non-linear precoding, according to evaluated channel characteristics. The precoding scheme selection is determined according to the estimated values of FEXT coupling coefficients. Transceiver controller 116 further determines the specifics of the modulation scheme that is employed (e.g., 4096-QAM), taking into account CPE-based data (e.g., bit loading, gain per subcarrier frequency determined by the CPE receiver units), to encode data per subcarrier (i.e., specific constellation data). Transceiver controller 116 sends (i.e., as well as updates) the precoding scheme selection to input selector 124 via carriers' selection control channel 130. Input selector 124 performs the determined subcarrier selection. Input selector 124 outputs signals (i.e., to post-precoder parts of transceivers $114_1$, $114_2$, ..., $114_N$), each of which may be represented by a matrix whose elements are complex values (i.e., that define the respective amplitudes and phases of the signal) respective for each subcarrier and for each of communication channels $106_1$, $106_2$, ..., $106_N$. The outputted signal from input selector 124 is sent to the IFFT and time domain unit (TDU) modules (not shown) and the respective AFEs and lines I/Fs (not shown). Essentially, the IFFT and TDU module are operative to convert a signal from the frequency domain to the time domain.

Once transceiver controller 116 determines the precoding scheme selection, it communicates this information to the CPE units $104_1$, $104_2$, ..., $104_N$ via forward logical channel 134. Post-precoder parts of transceivers $114_1$, $114_2$, ..., $114_N$ of DP 102 transmit the data payload using the two precoding schemes according to the determined precoding scheme selection.

Figure 4:
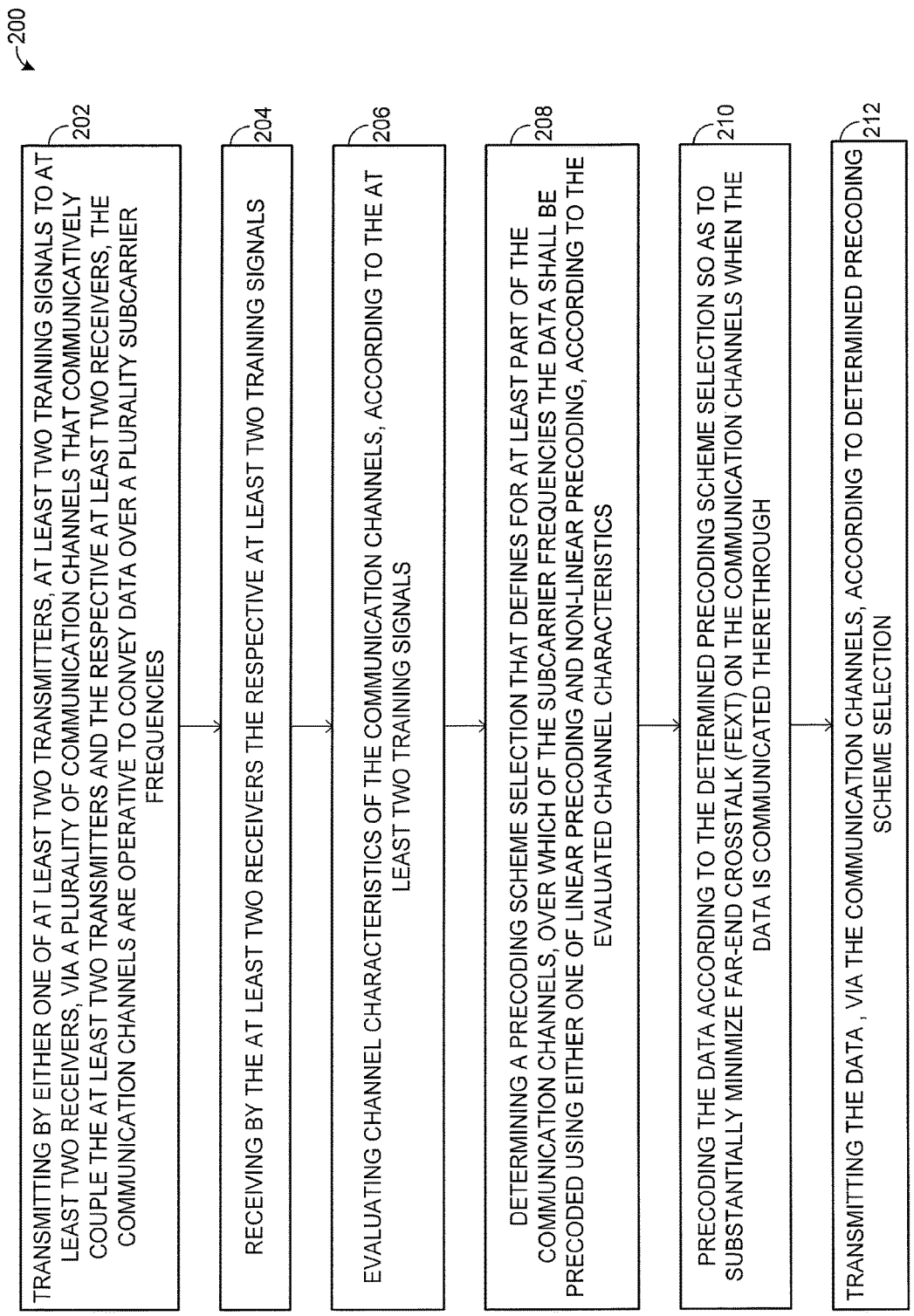
FIG. 4 is a schematic block diagram of a method employing linear precoding and non-linear precoding, constructed and operative according to the embodiment of the disclosed technique.

Reference is now made to FIG. 4, which is a schematic block diagram of a method employing linear precoding and non-linear precoding, generally referenced 200, constructed and operative according to the embodiment of the disclosed technique. In particular, method 200 employs linear precoding and non-linear precoding according to a hybrid precoding scheme so as to substantially minimize FEXT during transmission of data on a plurality of communication channels that link between at least two transmitters and a plurality of receivers. The method initiates in procedure 202.

In procedure 202 at least two training signals are transmitted by either one of at least two transmitters, to at least two receivers, via a plurality of communication channels that communicatively couple the at least two transmitters and the respective at least one receiver; the communication channels are operative to convey data over a plurality subcarrier frequencies. With reference to FIG. 1, a training signal is transmitted by transceivers $110_1$, $110_2$, ..., $110_N$ of DP 102 to the transceivers of CPE units $104_1$, $104_2$, ..., $104_N$ via communication channels $106_1$, $106_2$, ..., $106_N$ over (at least part of) a plurality of k subcarrier frequencies.

In procedure 204, the at least two training signals are received by the respective at least two receivers. With reference to FIG. 1, CPE units $104_1$, $104_2$, ..., $104_N$ receive the training signals via communication channels $106_1$, $106_2$, ..., $106_N$.

In procedure 206, channel characteristics of the communication channels are evaluated, according to the at least two training signals. With reference to equation (1) and FIGS. 2 and 3, channel matrix $H^{(k)}$ (equation (1)) per subcarrier k is evaluated from returned training signals that are received by transceiver controller 116 (FIG. 2), via uplink backchannel 136 (FIG. 2), according to the error generated by slicer/FEC block 150 (FIG. 3).

In procedure 208, a precoding scheme selection is determined. The precoding scheme selection defines for at least part of the communication channels, over which of the subcarrier frequencies the data shall be precoded using either one of linear precoding and non-linear precoding, according to the evaluated channel characteristics. With reference to FIGS. 1 and 2, transceiver controller 116 (FIG. 2) determines for communication channels $106_1$, $106_2$, ..., $106_N$ (FIG. 1) over which of k subcarrier frequencies, the data shall be precoded using linear precoder 120 (FIG. 2) or non-linear precoder 122 (FIG. 2), according to the determined channel characteristics. For example, for those carrier frequencies where the FEXT level is relatively low, linear precoding is employed, and for those carrier frequencies where the FEXT level relatively high, non-linear precoding of data is employed.

In procedure 210, the data is precoded according to the determined precoding scheme selection so as to substantially minimize far-end crosstalk (FEXT) on the communication channels when the data is communicated therethrough. With reference to FIGS. 1 and 2, data is precoded by linear precoder 120 (FIG. 2) and non-linear precoder 122 (FIG. 2), according to the precoding scheme selection, as performed by input selector 124, so as to substantially minimize FEXT on communication channels $106_1$, $106_2$, ..., $106_N$ (FIG. 1) transmitted therethrough, via cable binder 108.

In procedure 212, data is transmitted via the communication channels, according to the determined precoding scheme selection. With reference to FIGS. 1 and 2, data is transmitted via communication channels $106_1$, $106_2$, ..., $106_N$ (FIG. 1), according to the determined precoding scheme selection, as determined by transceiver controller 116 (FIG. 2) and executed by input selector 124 (FIG. 2). The data is transmitted from transceivers $110_1$, $110_2$, ..., $110_N$ (FIG. 1) of DP 102 toward respective transceivers of CPEs $104_1$, $104_2$, ..., $104_N$ via communication channels $106_1$, $106_2$, ..., $106_N$.

The system and method of the disclosed technique are further constructed and operative to apply gain correction at the receiver side in cases where changes, such as updates to the precoder coefficients, cause gain level mismatch that occurs when gain parameters employed by the receiver and respective gain parameters employed by the transmitter do not optimally match. This may also be as a result of the need to keep the transmitted signal frequency spectrum within the regulatory power spectral density (PSD) mask (e.g., PSD constraints, PSD values). The PSD mask defines the maximum allowed transmit signal level per subcarrier frequency within a frequency spectrum. This method of gain correction may be implemented individually in linear precoders, non-linear precoders, as well as in hybrid precoding system 100.

An updated precoder matrix may increase its respective precoder transmitted power spectral density above (i.e., above an upper allowed limit, for some subcarrier frequencies), therefore some normalization factor is required. Since there are k hybrid precoders 100 implemented for each of the k subcarrier frequencies, for each hybrid precoder 100, there is associated a power normalization (scaling) factor. Information pertaining to this power normalization factor, has to be communicated to the receiver in order to coordinate (e.g., equalize, normalize) the receive channel path gain of the CPE to the updated DP transmitter channel path gain. In general, changes to the precoder coefficients (e.g., precoder parameters that are updated from time to time) may influence the transmitted signal power. This may occur during "adaptation", which is when updated precoder coefficients are first recalculated, then updated, and thereafter employed (applied), thereby replacing previously-used precoder coefficients. This gain level mismatch has to be compensated for at the receiver side. This is referred to herein as "gain correction". Since the transmitter (DP) typically instigates this gain correction procedure, it may be also referred to as "transmitter-initiated gain adjustment", "transmitter-initiated gain coordination" or "transmitter-initiated gain correction".

Essentially, the method disclosed herein employs precoding (i.e., either linear precoding, non-linear precoding, or both (hybrid precoding)) and is operative to perform gain coordination (i.e., also referred herein as gain adjustment, gain correction) between at least one of at least two transmitters that define a transmitter side and respective at least one receiver of at least two receivers define a receiver side that are communicatively coupled via a plurality communication channels over a plurality of subcarrier frequencies. In general this transmitter-initiated gain adjustment method includes the following basic procedures. First, precoding coefficients for each of the subcarrier frequencies are calculated at the transmitter side. Next, for at least part of the subcarrier frequencies, a gain scaling factor also referred herein as "gain correction") is determined (e.g., calculated, estimated) that normalizes a respective transmitted output signal from each of the at least two transmitters to be limited by respective (given, predetermined) power spectral density (PSD) constraints (values). Thereafter, the gain scaling factor is substantially simultaneously applied to at least one of the at least two transmitters, as well as the respective at least one of the at least two receivers, in accordance with the respective determined gain scaling factor. The term "gain scaling factor" may encompass power normalization values as well as changes to the gain as a result of respective changes to precoding matrix element value changes.

Different reasons exist for the need to apply gain corrections, for each of the respective linear and non-linear precoding schemes. For the linear precoding scheme, changes to the direct communication path gains could be as a result of PSD normalization as well as changes to the precoding matrix elements. Gain correction per subcarrier may be represented by a real scalar, in case changes are related to the PSD normalization or by a complex number in case changes are related to the precoding matrix elements. Normalization is required in order to meet the applicable power or PSD mask constraints. Given that use of the linear precoder may influence the transmission power (i.e., per subcarrier) of a transmitted signal, the receiver has to compensate for any such pertinent changes. For example, the transmitted signal may be attenuated along the communication channels (e.g., for a particular subcarrier frequency, or group of subcarrier frequencies), such that the receiver may have to compensate for this attenuation, since at that point the gain employed by the transmitter, evidently does not match gain employed by the receiver. For the non-linear scheme, changes to the direct paths gains are a result of the application of a unitary matrix Q in the precoder, at transmission matrix block 142.

The application of gain correction at CPE side may be realized according to various approaches. A first approach involves conveying the gain corrections via a communication channel, while a second approach avoids the need to communicate gain corrections.

In the first approach, the communication channel is used for conveying gain corrections, according to two different and independently employed methods. Alternatively, these two methods may be combined. A first method for implementing a communication channel for conveying gain corrections is based on a communication protocol. The advantage in this method is reliability, whereas its disadvantage lies in the relatively longer time it takes to convey the gain correction information to the CPEs (i.e., in comparison to that of the second method whose description follows). Forward logical channel 134 is employed to communicate the respective gain corrections (i.e., for each of the CPEs), from DP 102 to CPEs $104_1$, $104_2$, ..., $104_N$. Once a gain correction is received by a CPE unit, it is applied, typically by modifying the gain of the FEQ of the CPE unit (i.e., FEQ block 146 in FIG. 3). A synchronization protocol is used in order to coordinate the time at which both the application of gain scaling factor (e.g., gain modifications, gain corrections) to the FEQs at the receiver side as well as the updated precoder coefficients (i.e., for linear precoder 120 and for non-linear precoder 122, respectively) at the transmitter side are applied (substantially simultaneously). The CPE units are operative to be compatible with the gain correction requests initiated by the DP.

A second method for implementing a communication channel for conveying gain corrections is based on the employment of a header field like RMC (Robust Management Channel) available per time division duplex (TDD) frame. Since, the size of the update message that conveys the gain corrections is typically limited, a coarse gain update correction is employed, where such a correction is applied to a group of subcarriers rather than individual subcarriers. This header field indicates a coarse gain update (e.g., correction, adjustment) that is to be applied over the entire band of subcarriers. Alternatively, this header field indicates a plurality of coarse gain updates to be applied over the corresponding group of subcarriers. Since this gain correction is coarse it can be specified (i.e., defined) via a relatively small number of parameters, and thus communicated to the CPE fairy quickly. Coarse gain correction is executed relatively rapidly (i.e., comparison to the utilization of the communication protocol, which communicates gain corrections per subcarrier individually) at the expense of sub-optimal performance. This sub-optimal performance is not due to gain mismatch between transmitter and receiver, but rather is a consequence from the under-utilization of the allotted PSD mask. This second method is relatively faster than the first method (above) for conveying gain corrections. As the amount of data for this header field may be very limited with this method, a single gain correction (gain scaling factor) is used or several gain values are typically used. In case a single gain value is used, this gain correction is applied to all of the k OFDM subcarrier frequencies, such that the PSD of the outputted transmitted signal from the transmitter does not exceed the PSD mask. Hence, the outputted transmitted signal from the transmitter is limited by the (given, known, or predetermined) PSD mask (i.e., PSD values, PSD constraints). The receiver may decode this information rather quickly and apply it over the same received frame (i.e., or at least part of the frame, or soon thereafter). Alternatively, several gain scaling factors are employed for several respective groups of subcarriers frequencies. As a result, upon the application of a gain correction (i.e., modification, adjustment), the CPE may respond, at first, very quickly with a rough correction (e.g., typically a flat gain response curve as a function of frequency) and later apply a more accurate (i.e., refined, finer) gain correction. Although the application of a single gain scaling factor to a group of subcarrier frequencies may be suboptimal, it maintains ("ensures") that the PSD of the outputted transmitted signal for each group of subcarriers does not exceed the PSD mask. Hence, the PSD of the outputted transmitted signal for each group of subcarriers is limited by the PSD mask (PSD constraints, PSD values). The advantage of this approach is that it allows relatively quick adaptation (updating, employment) of precoder coefficients without exceeding the PSD constraints. Application of a more accurate gain correction involves conveying additional information (e.g., messages large in size) to the CPE, via forward logical channel 134 (i.e., refined gain correction per carrier). Information pertaining to this finer gain adjustment may be communicated to the CPE by using the communication protocol. The alternative method entails combining both the first and second methods for conveying gain corrections for enhanced performance. Implementation of this alternative of combined methods is based on the use of a TDD-frame header field for relatively "fast" gain corrections, and also the use of forward logical channel 134 for "slower", more refined gain corrections.

An alternative approach avoids the need to communicate the gain scaling factor (gain correction) from the DP to the CPEs. According to this second approach, the updated precoder coefficients are applied to training signals (or probing symbols). Examples for such symbols employed for this objective include the sync symbol that are specified for channel training/tracking purposes by vectored VDSL or G.fast technologies. In response to the adaptation of updated precoder coefficients at the DP side, the employed gain parameters may not conform to the gain parameters employed at the CPE side. According to this approach, instead of communicating the appropriate gain correction, the CPEs are given some time to autonomously obtain (e.g., self-determine, learn) the new gain parameters of the DP and thereafter apply these new gain parameters. This adaptation involves the use of training signals, whereupon the FEQ at the CPE side automatically adapts the updated precoder coefficients concurrently with its routine operation. Hence, the application of the gain scaling factor is performed via the transmission of training signals through updated precoding coefficients between the transmitter side and the receiver side. For example, updated precoder coefficients are applied through these sync symbols, whereas data symbols employ the previous precoder coefficients. When the FEQ at the CPE side completes adaptation of the updated precoder coefficients, the DP may then use the updated precoder coefficients for the data symbols. The adaptation of gain parameters at the FEQ may be coordinated in time to coincide with the use of the updated precoder coefficients.

A generalized schematic block diagram that summarizes the main method steps for transmitter-initiated gain coordination is shown in FIG. 5. FIG. 5 is a schematic block diagram of a method employing precoding, perform in gain coordination between a transmitter side and a receiver side, generally referenced 250, constructed and operative according to another aspect of the disclosed technique. Method 250 initiates at procedure 252.

In procedure 252, precoding coefficients of a precoder are calculated, for each of one in a plurality of subcarrier frequencies employed to convey data over a plurality of communication channels that communicatively couple between at least two transmitters that define a transmitter side and respective at least two receivers that define a receiver side. The calculation of the precoding coefficients is performed at the transmitter side. With reference to FIGS. 1 and 2, respective precoding precompensation matrices (such as $P^{(k)}$ respectively for linear precoder 120 and non-linear precoder 122), per subcarrier frequency k, are calculated by transceiver controller 116 (FIG. 2). Communication channels $106_1$, $106_2$, . . . , $106_N$ (FIG. 1) communicate data via over a plurality of subcarrier frequencies between transmitters (transceivers $110_1$, $110_2$, . . . , $110_N$ at DP 102) and respective transceivers at CPE receiver units $110_1$, $110_2$, . . . , $110_N$ (FIG. 1).

In procedure 254, for each of the subcarrier frequencies a gain scaling factor is determined, normalizing a respective transmitted output signal from each of the at least two transmitters, limited by power spectral density (PSD) values. With reference to FIGS. 1 and 2, a gain scaling factor (not shown) for each of k subcarrier frequencies is calculated by transceiver controller 116 (FIG. 2), such that a transmitted output (not shown) from each of at least two transmitters (i.e., transceivers $110_1$, $110_2$, . . . , $110_N$, at DP 102—FIG. 1) complies with given PSD constraints.

In procedure 256, the gain scaling factor is substantially simultaneously applied to at least one of the at least two transmitters and respective at least one of the at least two receivers, according to the respective determined gain scaling factor. Procedure 256 may be performed by at least one of two options. According to option 1 in procedure 258, the gain scaling factor is applied by conveying information pertaining to the gain scaling factor from the transmitter side to the receiver side via a forward logical communication channel. With reference to FIGS. 1 and 2, transceiver controller 116 (FIG. 2) conveys information pertaining to the gain scaling factor from the transmitter (DP 102, FIG. 1) to the receiver side (i.e., CPE units $104_1$, . . . , $104_N$) via forward logical channel 134 (FIG. 2). This gain scaling factor is applied at least one of at least two transmitters (e.g., transceivers $110_1$, $110_2$, . . . , $110_N$ or to each linear precoder 120 and non-linear precoder 122 for k subcarrier frequencies) as well as to the FEQ block 146 (FIG. 3) of the respective one of at least two of CPE units $104_1$, . . . , $104_N$.

According to option 2 in procedure 260, the gain scaling factor is applied by transmitting from the transmitter side to the receiver side train signals through updated determined precoding coefficients. With reference to FIGS. 1, 2 and 3, the gain scaling factor (not shown) is applied by transceiver controller 116 (FIG. 2) applying the determined precoder coefficients of respective precoding precompensation matrices (such as $P^{(k)}$ respectively for linear precoder 120 and non-linear precoder 122—FIG. 2), per subcarrier frequency k, to training signals (e.g., represented by the vector $T=[t_1, \ldots, t_N]$. The training signals are transmitted from the transmitter side (FIG. 3 and DP 102 in FIG. 1) to the receiver side (FIG. 3 and CPE receiver units $110_1$, $110_2$, . . . , $110_N$ in FIG. 1) via communication channels $106_1$, $106_2$, . . . , $106_N$ (FIG. 1).

The invention claimed is:

1. A transmitter-initiated gain adjustment method employing precoding for at least one of mitigating and cancelling cross-talk, performing gain coordination between at least one of at least two transmitters that define a transmitter side and respective at least one receiver of at least two receivers that define a receiver side that are communicatively coupled via a plurality communication channels over a plurality of subcarrier frequencies, the method comprising the procedures of:

calculating precoding coefficients for said subcarrier frequencies, at said transmitter side;

for at least part of said subcarrier frequencies, determining a gain scaling factor based on calculated said precoding coefficients, normalizing a respective transmitted output signal from each of said at least two transmitters, limited by respective power spectral density (PSD) values; and applying, in a time coordinated manner, said gain scaling factor and said precoding coefficients to at least one of said at least two transmitters and respective said gain scaling factor to at least one of said at least two receivers, according to respective determined said gain scaling factor, wherein said applying includes said transmitter side conveying information pertaining to said gain scaling factor to said receiver side.

2. The method according to claim 1, further comprising a procedure of coordinating a time at which said procedure of applying said gain scaling factor at said receiver side, coincides with use of updated calculated said precoder coefficients at said transmitter side, via a synchronization protocol.

3. The method according to claim 1, further comprising a procedure of communicating a coarse gain correction to said gain scaling factor and then a fine gain correction to said gain scaling factor, with respect to a plurality of said subcarrier frequencies, from said transmitter side to said receiver side.

4. The method according to claim 1, wherein said gain scaling factor is different for at least some of said subcarrier frequencies.

* * * * *